（12）United States Patent
Nakayama

(10) Patent No.: US 8,451,143 B2
(45) Date of Patent: May 28, 2013

(54) VEHICLE PRESENCE NOTIFICATION APPARATUS

(75) Inventor: Toshiaki Nakayama, Miyoshi (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 165 days.

(21) Appl. No.: 13/011,137

(22) Filed: Jan. 21, 2011

(65) Prior Publication Data
US 2011/0181442 A1 Jul. 28, 2011

(30) Foreign Application Priority Data

Jan. 22, 2010 (JP) .................................. 2010-12059

(51) Int. Cl.
G08G 1/01 (2006.01)
G08G 1/16 (2006.01)
B60Q 1/00 (2006.01)
B60R 25/10 (2006.01)
H04B 1/06 (2006.01)
B06B 1/06 (2006.01)
G01S 15/00 (2006.01)
B60T 7/16 (2006.01)
H03B 29/00 (2006.01)

(52) U.S. Cl.
USPC .................. 340/933; 340/425.5; 340/426.25; 340/903; 340/435; 340/441; 367/135; 367/140; 367/116; 180/167; 180/169; 381/71.4

(58) Field of Classification Search
USPC .................. 340/933, 435, 384.1, 384.3, 692, 340/903, 943, 901, 441, 388.1, 384.73, 425.5, 340/426.25; 381/57, 61, 86, 302, 77; 701/96, 701/93, 95, 300; 342/70, 71; 367/135, 140, 367/116, 131; 180/167, 169
See application file for complete search history.

(56) References Cited

U.S. PATENT DOCUMENTS

| | | | | |
|---|---|---|---|---|
| 5,432,755 | A | * | 7/1995 | Komninos ..................... 367/135 |
| 5,508,661 | A | * | 4/1996 | Keane et al. ..................... 331/37 |
| 5,635,903 | A | | 6/1997 | Kioke et al. |
| 2004/0206177 | A1 | * | 10/2004 | Baba et al. ................. 73/514.34 |

(Continued)

FOREIGN PATENT DOCUMENTS

| | | |
|---|---|---|
| JP | S57-065131 | 4/1982 |
| JP | 2-073296 | 3/1990 |

(Continued)

OTHER PUBLICATIONS

Japanese Office Action dated Oct. 18, 2011, issued in corresponding Japanese Application No. 2010-012059 with English Translation.

(Continued)

Primary Examiner — Jennifer Mehmood
Assistant Examiner — Mirza Alam
(74) Attorney, Agent, or Firm — Nixon & Vanderhye PC

(57) ABSTRACT

A vehicle presence notification apparatus notifies a presence of a vehicle by providing easily-perceivable and less uncomfortable notification sound outside of the vehicle. The vehicle presence notification apparatus includes: a speaker and a controller. The controller is configured to cause the speaker to generate the notification sound that simultaneously has (i) at least one fundamental high frequency, which is easily perceivable, but annoying to human ears; and (ii) at least one auxiliary low frequency, which is less than the at least one fundamental high frequency and has a harmonic relation with the at least one fundamental high frequency.

10 Claims, 5 Drawing Sheets

U.S. PATENT DOCUMENTS

| | | | |
|---|---|---|---|
| 2005/0200462 A1* | 9/2005 | Maekawa et al. | 340/435 |
| 2005/0274541 A1* | 12/2005 | Takahashi | 174/255 |
| 2005/0286346 A1* | 12/2005 | Croft et al. | 367/140 |
| 2007/0229235 A1 | 10/2007 | Hirai | |
| 2007/0257783 A1* | 11/2007 | Matsumoto et al. | 340/425.5 |
| 2010/0066164 A1* | 3/2010 | Kokubo | 303/191 |

FOREIGN PATENT DOCUMENTS

| | | |
|---|---|---|
| JP | H05-058219 | 3/1993 |
| JP | 6-162351 | 6/1994 |
| JP | P2006-264390 A | 10/2006 |
| JP | P2007-022486 A | 2/2007 |
| JP | 2007-237831 | 9/2007 |
| JP | 2008-143442 | 6/2008 |
| JP | 2009-63968 | 3/2009 |

OTHER PUBLICATIONS

Chinese Office Action dated Mar. 12, 2012, issued in corresponding Chinese Application No. 201110034484.8 with English Translation.

Office Action dated Jan. 17, 2013 in CN 201110034484.8 with English translation.

Chinese Office Action dated Sep. 13, 2012, issued in corresponding Chinese Application No. 201110034484.8 with English Translation.

* cited by examiner

MORE EASILY-PERCEIVABLE

SOFTER TONE

VEHICLE PRESENCE NOTIFICATION APPARATUS

CROSS REFERENCE TO RELATED APPLICATION

The present application is based on and claims priority to Japanese Patent Application No. 2010-12059 filed on Jan. 22, 2010, disclosure of which is incorporated herein by reference.

BACKGROUND

1. Technical Field

The present disclosure relates to a vehicle presence notification apparatus for notifying the presence of a vehicle to an outside of the vehicle by using notification sound. In particular, the present disclosure relates to notification of the presence of such a vehicle as an electric vehicle, a fuel cell vehicle, a hybrid vehicle and the like, each of which is capable of traveling with an electric motor generating rotative power from electric power.

2. Description of Related Art

A vehicle presence notification apparatus, which notifies the presence of a vehicle to the surroundings of the vehicle by using notification sound, needs to generate the notification sound that is easily-perceivable to human ears. In this relation, it is conceivable that the sound with "high frequencies" is generated as easily-perceivable notification sound. The sound with "high frequencies" is easily perceivable but is "annoying or sticking sound", which provides an unconformable feeling to people. For example, the sound with 4 kHz is easily-perceivable but really annoying. If a vehicle travels while radiating sound with 4 kHz, the vehicle provides uncomfortable feeling to people around the vehicle.

If frequency of the notification sound is lowered for reduction of the uncomfortable feeling, the notification sound easily blends into environment noise, becomes less perceivable by humans, and becomes less effective in notification of the presence of a vehicle to the surroundings.

JP-H06-162351A describes a technique to automatically adjust sound pressure level of the notification sound to surrounding noise in order to reduce the uncomfortable feeling caused by too large of a notification sound. However, the technique disclosed in JP-H06-162351A cannot solve a difficulty of providing the high frequency notification sound and the uncomfortable feeling to people.

SUMMARY

The present exemplary embodiments are made in view of the foregoing. It is an objective of the present exemplary embodiments to provide a vehicle presence notification apparatus that allows people to easily perceive the presence of a vehicle while reducing an uncomfortable feeling.

According to one aspect, a vehicle presence notification apparatus for notifying a presence of a vehicle by providing notification sound to an outside of the vehicle includes a speaker and a controller. The controller is configured to cause the speaker to generate the notification sound that simultaneously has at least one fundamental high frequency and at least one auxiliary low frequency. The at least one fundamental high frequency is easily perceivable, but annoying (i.e., "sticking") to human ears. The at least one auxiliary low frequency is less than the at least one fundamental high frequency and has a harmonic relation with the at least one fundamental high frequency.

According to the above vehicle presence notification apparatus, it is possible to allow people to easily perceive the presence of a vehicle while reducing a less uncomfortable feeling from the notification sound.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Figure 1:
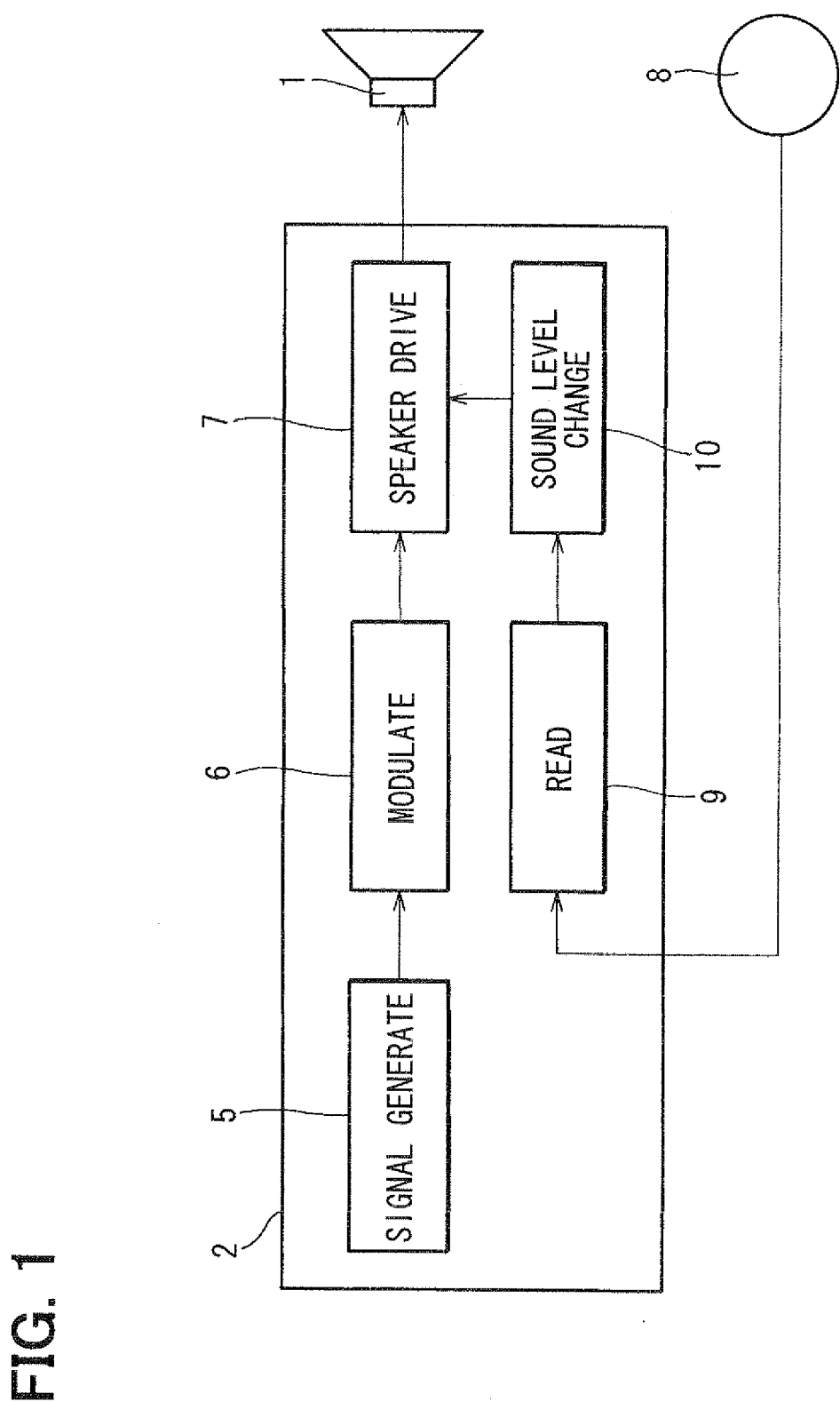
FIG. 1 is a diagram illustrating a vehicle presence notification apparatus.

A vehicle presence notification apparatus according to embodiments of the present invention will be described below with reference to the accompanying drawings. The vehicle presence notification apparatus generates notification sound that simultaneously has:

(i) a least one fundamental high frequency, which is easily perceivable, but annoying (i.e., "sticking") to human ears (i.e., a high frequency that a person generally feel uncomfortable and annoying to hear); and (ii) a least one auxiliary low frequency, which is lower than the fundamental high frequency and which has a harmonic relation (i.e., overtone relation) with the fundamental high frequency.

The notification sound generated by the vehicle presence notification apparatus may suffice when the notification sound contains a frequency component with "the above-described fundamental high frequency" and a frequency component with "the above-described auxiliary low frequency". Therefore, for example, the notification sound generated by the vehicle presence notification apparatus (i) may contain only the frequency component with "the above-described fundamental high frequency" and the frequency component with "the above-described auxiliary low frequency"; or (ii) may further contain another frequency component in addition to the frequency component with "the above-described fundamental high frequency" and the frequency component with "the above-described auxiliary low frequency".

The above-described frequency component with the at least one fundamental high frequency is also referred to hereinafter as high frequency sound of the notification sound. The high frequency sound in the notification sound generated by the vehicle presence notification apparatus may have:

(i) only a single fundamental high frequency (see the below-described first embodiment); or, (ii) multiple fundamental high frequencies (see the below-described second embodiment).

In the case of the multiple fundamental high frequencies, it may be preferable that the multiple fundamental high frequencies form a chord (see the below-described second embodiment).

The vehicle presence notification apparatus may generate the notification sound by using:

(i) a parametric speaker for generating the notification sound that is made audible at a point spaced apart from the vehicle; or (ii) a speaker for directly generating audible sound and emitting audible notification sound from the vehicle.

First Embodiment

A specific example of the vehicle presence notification apparatus will be described with reference to FIGS. 1 to 4 in accordance with a first embodiment. In the first embodiment, the vehicle presence notification apparatus uses a parametric speaker to generate the notification sound, which is made audible at a point spaced apart from the vehicle.

[Configuration of First Embodiment]

The vehicle presence notification apparatus of the first embodiment includes an ultrasound speaker 1 (also called herein a parametric speaker) capable of radiating ultrasound and a controller 2 (also called herein a main unit) for controlling the ultrasound speaker 1.

(Explanation on Ultrasound Speaker 1)

The ultrasound speaker 1 is mounted to, for example, a front part of a vehicle to generate and emit ultrasound toward an outside of the vehicle.

The ultrasound speaker 1 can be mounted to the vehicle in various ways. For example, when the ultrasound speaker 1 is mounted to a vehicle equipped with an internal combustion engine (which generates rotative force by fuel combustion), the ultrasound speaker 1 may be mounted to an inside of an air intake opening portion of a radiator grille so that the ultrasound speaker 1 emits ultrasound toward the front of the vehicle, e.g., emits the ultrasound diagonally to the front of the vehicle in a direction to a sidewalk. In the above, the opening portion of the radiator grille is a portion arranged at a front part of the vehicle to let air enter therethrough and cool down a radiator in response to vehicle movement. In a case of a vehicle having no radiator (e.g., electric vehicle), the ultrasound speaker 1 may be mounted to an air intake opening part for letting cooling-air enter therethrough in response to the vehicle movement.

In should be noted that mount position of the ultrasound speaker 1 is not limited to the front part of the vehicle. For example, the ultrasound speaker 1 may be mounted to a rear part of the vehicle or a lower surface of the vehicle and the ultrasound speaker 1 may radiate the notification sound to a rear of the vehicle when the vehicle moves rearward. A radiation direction of the ultrasound from the ultrasound speaker 1 may be fixed to a certain direction, or may be switchable in accordance with driving state of the vehicle or the like. It is possible to employ a variety of ways to switch the radiation direction of the ultrasound. For example, multiple ultrasound speakers 1 having different radiation directions may be mounted and selectively switched. Alternatively, an electric actuator such as solenoid and the like may drive a support of the ultrasound speaker 1 to switch the radiation direction of the ultrasound.

For example, the ultrasound speaker 1 may have the following configuration. The ultrasound speaker 1 includes an ultrasound generator for generating air vibration having a frequency above the human audible range (above 20 kHz). It should be noted that ultrasound has strong directivity. In other words, the ultrasound has a strong straight propagation property in air. Thus, the ultrasound can be radiated in a specific direction relative to the vehicle by using the ultrasound speaker 1. The specific direction is, for example, a direction in which the presence of the vehicle is to be notified, and may be a diagonally forward direction to a sidewalk.

Figure 2A:
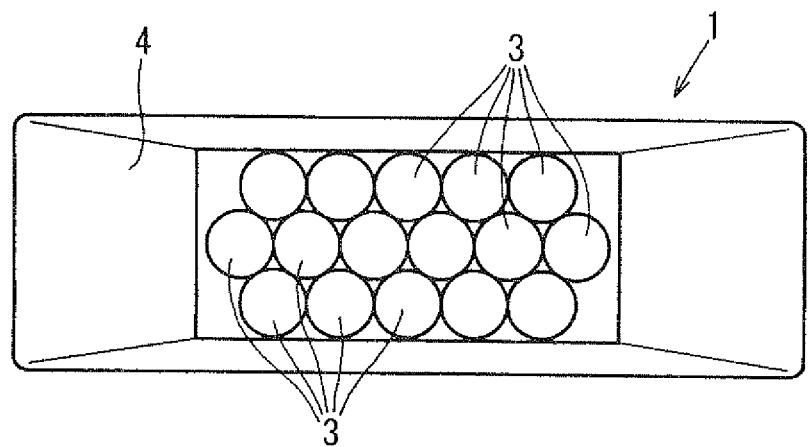
FIGS. 2A and 2B are diagrams illustrating a front view and a top view of an ultrasound speaker, respectively.
Figure 2B:
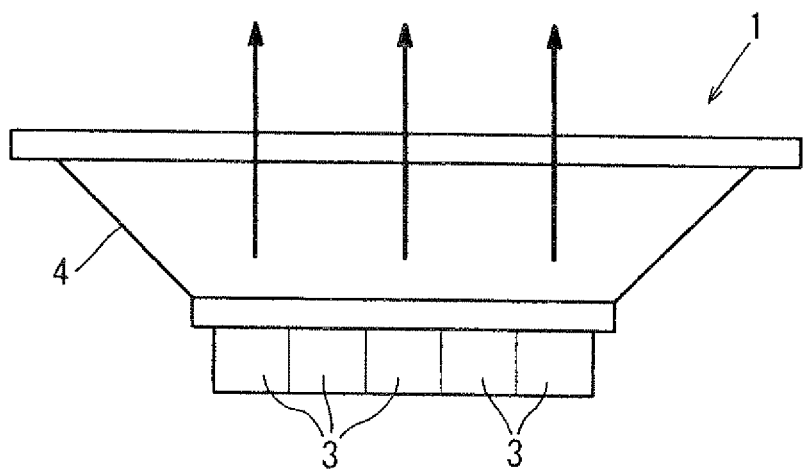

FIGS. 2A and 2B illustrate the ultrasound speaker 1 of the present embodiment. The ultrasound speaker 1 includes a speaker array with multiple piezoelectric speakers 3 each adapted to produce ultrasound (e.g., ceramic speaker, piezo speaker). The piezoelectric speaker 3 includes a piezoelectric element deformable in accordance with applied voltage (or charge and discharge), and a diaphragm for applying vibration to air in accordance with the deformation of the piezoelectric element.

The ultrasound speaker 1 can control an energy amount of the ultrasound to be generated and a radiation pattern (e.g., directivity, range) of the ultrasound to be emitted from the piezoelectric speakers 3, by selecting which piezoelectric speaker 3 to use. The selecting includes designating the number and arrangement of piezoelectric speakers 3 to be used. By using a horn portion 4 of the ultrasound speaker 1, it is also possible to control the radiation pattern of the ultrasound, as shown in FIGS. 2A and 2B. Although the piezoelectric speakers 3 are employed as an example of a speaker for generating ultrasound, the speaker is not limited to this example. Any device capable of producing ultrasound can be used as ultrasound generation device or means.

(Explanation on Main Unit 2)

The main unit 2 (the controller 2) for controlling the ultrasound speaker 1 will be described below.

The controller 2 includes a notification sound signal generation portion 5 configured to generate a frequency signal indicating the notification sound, an ultrasound amplitude modulation portion 6 configured to modulate the frequency signal, which indicates the notification sound, into an amplitude signal having an ultrasound frequency, and a speaker drive portion 7 configured to drive the ultrasound speaker 1 in accordance with the amplitude signal having the ultrasound frequency. The controller 2 is operated when the controller 2 receives an operation signal (e.g., a notification sound generation signal) from an electronic control unit, an engine control unit and the like, each of which is abbreviated as ECU. The controller 2 further includes the below-described portion or means for automatically adjusting output level (sound volume) of the ultrasound speaker 1 based on environment noise of the vehicle. The controller 2 further includes a power supply portion (not shown) that is connected to an in-vehicle power source such as an in-vehicle battery and the like, and that is configured to supply electric power required for operation of respective circuits (e.g., electrical functional parts) of the controller 2.

The above portion or means will be more specifically described. The notification sound signal generation portion 5 generates a frequency signal that has synthesized waveform and that includes the multiple frequencies of the notification sound, by utilizing:

(i) multiple oscillators;

(ii) a digital sound generation technique, which may use a computer to create arbitrary waveform signal as the frequency signal based on a clock signal generated by a reference clock such as a crystal oscillator and the like; or (iii) a synthesizer technique, which may use a comb filter to extract arbitrary frequency signals (i.e., the frequency signal indicating the notification sound) from pink noise or white noise generated in a noise source. The synthesizer technique may be achieved by an analog circuit, or an analog circuit combined with a computer.

The notification sound of the first embodiment has:

(i) a fundamental high frequency; and (ii) multiple auxiliary low frequencies, each of which is smaller than the fundamental high frequency and has a harmonic relation with the fundamental high frequency.

The fundamental high frequency is a high frequency that is easily perceivable, but annoying (i.e., "sticking") to human ears and is generally perceived as uncomfortable.

The fundamental high frequency is selected from a frequency range greater than or equal to 3 kHz and less than or equal to 7 kHz, sound with a frequency in which is easily sticking to human ears. In the present embodiment, a frequency of 4 kHz is employed as the fundamental high frequency.

The multiple auxiliary low frequencies include a frequency of one half of the fundamental high frequency. More specifically, since the fundamental high frequency is 4 kHz in the present embodiment, the auxiliary low frequencies include at least a frequency of 2 kHz, which is one half of 4 kHz.

In addition, the multiple auxiliary low frequencies further include at least a frequency lower than 1 kHz. For example, the multiple auxiliary low frequencies include at least a frequency of 500 Hz in the present embodiment where the fundamental high frequency is 4 kHz.

The multiple auxiliary low frequencies include three or more frequencies which have a harmonic ratio with each other and which are in series with each other in the harmonic relation. A specific example is as follows. When the fundamental high frequency is denoted by "A", the auxiliary low frequency is expressed as "A×(½)$^n$", where n is a consecutive integer n=1, 2, 3. When the fundamental high frequency "A" is 4 kHz as is the case of the present embodiment, the auxiliary low frequency comprises:

$$4\ kHz \times (½)^1 = 2\ kHz,$$

$$4\ kHz \times (½)^2 = 1\ kHz,\ and$$

$$4\ kHz \times (½)^3 = 500\ Hz.$$

The notification sound signal generation portion 5 of the present embodiment outputs the frequency signal including the notification sound, by synthesizing a waveform signal from:

a signal with 4 kHz, which is an example of the fundamental high frequency and which is very annoying but easily-perceivable;

a signal with 2 kHz, which is an example a first one of the auxiliary low frequencies and which is a maximum frequency that elder persons can easily perceive;

a signal with 1 kHz, which is an example of a second one of the auxiliary low frequencies and which is a most easily-perceivable sound for human ears; and a signal with 500 Hz, which is an example of a third one of the auxiliary low frequencies and which is a relatively less perceivable but soft.

The ultrasound amplitude modulation portion 6 includes an ultrasound oscillator capable of oscillating in an ultrasound frequency range exceeding 20 kHz, e.g., oscillating at an ultrasound frequency of 25 kHz. The ultrasound amplitude modulation portion 6 modulates the frequency signal (i.e., the synthesized waveform signal) outputted from the notification sound signal generation portion 5. Specifically, the ultrasound amplitude modulation portion 6 modulates "a voltage rise and fall change" of the synthesized waveform signal into "an amplitude change of voltage (or current) oscillating at the ultrasound frequency".

Figure 3A:
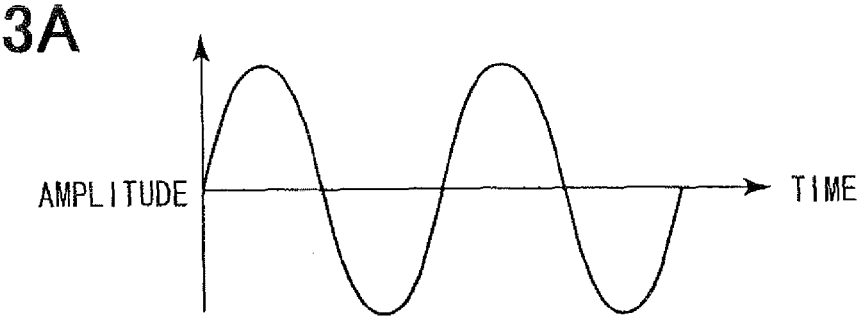
FIGS. 3A to 3E are diagrams illustrating a parametric speaker principle.
Figure 3B:
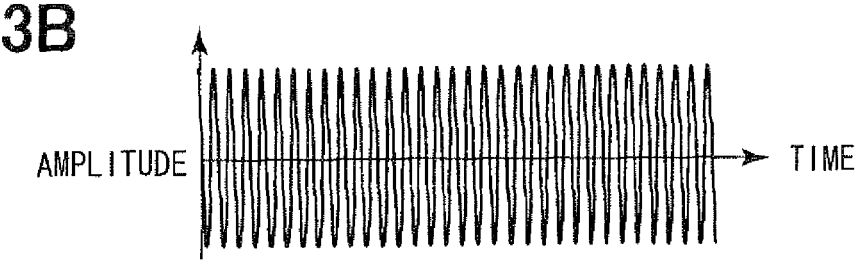

FIGS. 3A to 3E show an example of modulation of the synthesized frequency signal. FIG. 3A illustrates a synthesized waveform signal (i.e., frequency signal) inputted to the ultrasound amplitude modulation portion 6, by plotting a change of voltage (amplitude) over time. It should be noted that, for simplification of FIG. 3A, the signal is described as a single frequency waveform signal although an actual signal may be a synthesized signal with four frequencies. The ultrasound oscillator of the ultrasound amplitude modulation portion 6 oscillates at an ultrasound frequency, as shown in FIG. 3B. A signal in FIG. 3B is a carrier.

Figure 3C:
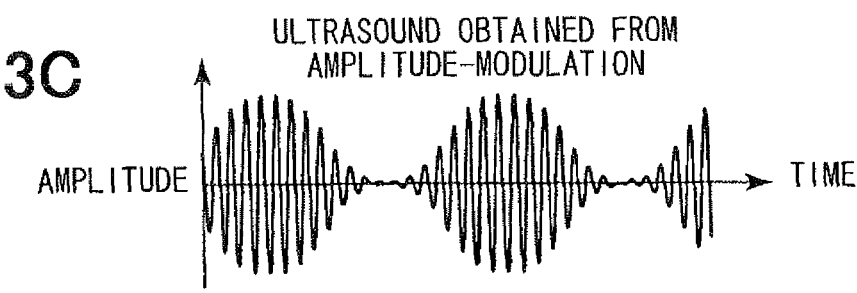

As shown in FIG. 3C, the ultrasound amplitude modulation portion 6 performs modulation so that (i) the ultrasound voltage oscillation has a large amplitude when the synthesized waveform signal indicating the notification sound has a large signal voltage, and (ii) the ultrasound voltage oscillation has a small amplitude when the synthesized waveform signal indicating the notification sound has a small signal voltage.

Thereby, the ultrasound amplitude modulation portion 6 modulates the synthesized waveform signal, which is inputted from the notification sound signal generation portion 6, into an amplitude change (or current) in voltage oscillating at the ultrasonic frequency.

In the above example, the change in signal voltage of the frequency signal indicating the notification sound is modulated into "voltage amplitude width" by the ultrasound amplitude modulation portion 6. Alternatively, the change in signal voltage of the frequency signal indicating the notification sound may be modulated into "voltage generation time width", by using a PWM (pulse width modulation technique) method.

The speaker drive portion 7 drives respective piezoelectric speakers 3 based on an ultrasound signal. The ultrasonic signal is an output signal of the ultrasound amplitude modulation portion 6 and is obtained from amplitude modulation of the frequency signal indicating the notification sound. The speaker drive portion 7 controls voltage applied to each piezoelectric speaker 3 (or control a charging and discharging state of each piezoelectric speaker 3), and thereby causes the piezoelectric speaker 3 to generate the ultrasound that carries, as a result of the amplitude modulation, the notification sound indicated in the frequency signal. A specific example is as follows. The speaker drive portion 7 may include a power amplifier (or a device for charging and discharging the piezoelectric element). When the ultrasound amplitude modulation portion 6 inputs the waveform signal shown in FIG. 3C to the speaker drive portion 7, the speaker drive portion 7 applies voltage having the waveform shown in FIG. 3C to the ultrasound speaker 1, thereby causing respective piezoelectric speakers 3 to generate the ultrasound having the waveform shown in FIG. 3C.

Now, explanation will be given on a manner of automatically adjusting output level or sound volume of the ultrasound speaker 1 based on environment noise of the outside of the vehicle. The controller 2 can automatically adjust amplification degree (amplification gain) of the speaker drive portion 7 based on the environment sound. To act as means for performing this automatic adjustment, the controller 2 includes an environment noise detection device 8 (also referred to as an environment noise detection portion 8), and a read portion 9 and a sound pressure level change portion 10. The environment noise detection device 8 detects the environment noise of the outside of the vehicle. The read portion 9 reads sound pressure level of the environment noise at the fundamental high frequency (4 kHz) from the detected environment noise. The sound pressure level change portion 10 changes the amplification degree of the speaker drive portion 7 based on the sound pressure level of the environment noise at the fundamental high frequency read by the read portion 9. In the above, the environment noise detection device 8 may not be a component of the controller 2 and may be external to the controller 2. The environment noise detection device 8 can act as environment noise detection means, and the read portion 9 can act as read means, the sound pressure level change portion 10 can act as sound pressure level adjust means.

The environment noise detection device 8 detects the environment noise of the outside of the vehicle. The environment noise to be detected may be the environment noise in a notification target area, which is an area targeted for notification of the notification sound. The environment noise detection device 8 may include a microphone provided separately from the ultrasound speaker 1, or may use one of the piezoelectric speakers 3 of the ultrasound speaker 1 as a microphone. The solid fine "A" in FIG. 4 A shows a frequency property example of the environment noise of the outside of the vehicle.

The read portion 9 reads the sound pressure level of the environment noise at the fundamental high frequency (e.g., 4 kHz) from the environment noise detected by the environment noise detection portion 8. The read portion 9 includes a microphone amplifier for amplifying a detection signal of the environment noise detection portion 8. Specifically, if the environment noise detected by the environment noise detection portion 8 has the frequency property shown by the solid line "A" in FIG. 4, the read portion 9 reads approximately 40 dB as the sound pressure level of the environment noise at 4 kHz. The read portion 9, which can act as means for reading the sound pressure level of the environment noise at the fundamental high frequency (e.g., 4 kHz), may perform sound volume analysis by utilizing a computer to detect the sound pressure level at the fundamental high frequency. Alternatively, the read portion 9 may detect the sound pressure level at a specific frequency, and may estimate the sound pressure level at the fundamental high frequency from the sound pressure level at the specific frequency.

The sound pressure level change portion 10 changes the amplification degree (e.g., amplification gain) of the speaker drive portion 7 in accordance with the sound pressure level of the environment noise at the fundamental high frequency read by the read portion 9. The sound pressure level change portion 10 changes the sound pressure level of the notification sound at the fundamental high frequency so that at the notification target area, the sound pressure level of the notification sound at the fundamental high frequency is larger than, by a predetermined sound pressure (e.g., 10 dB), that of the environment noise at the fundamental high frequency read by the read portion 9, as shown by line "B" in FIG. 4. In the above, the notification target area is an area that is targeted for notification of the notification sound and that is spaced apart from the vehicle by a predetermined distance. The notification target area may be for example, an area located forward of the vehicle on a side walk side.

The sound pressure level change portion 10 may be coupled with a vehicle speed sensor, and may increase the amplification degree (e.g., amplification gain) of the speaker drive portion 7 as vehicle speed is larger, so that the generated notification sound is larger as the vehicle speed is larger. The sound pressure level change portion 10 may change the amplification degree so that the generation of the notification sound is stopped when the vehicle speed is extremely small or large.

[Operation of Vehicle Presence Notification Apparatus]

Operation of the vehicle presence notification apparatus of the first embodiment will be described below. As described above, the vehicle presence notification apparatus operates in response to receiving an operation signal from the ECU or the like. For example, the vehicle presence notification apparatus has operational modes, including:

(i) a first mode in which the vehicle presence notification apparatus constantly operates when the vehicle is moving (e.g., when the vehicle is moving forward);

(ii) a second mode in which the vehicle presence notification apparatus operates only when vehicle velocity is in a predetermined velocity range; and (iii) a third mode in which the vehicle presence notification apparatus operates only when "a person recognition system (not shown)" detects a person in a traveling direction of the vehicle when the vehicle is moving.

Figure 3D:
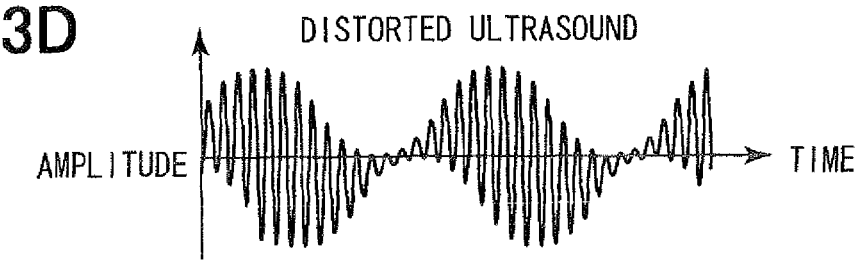
Figure 3E:
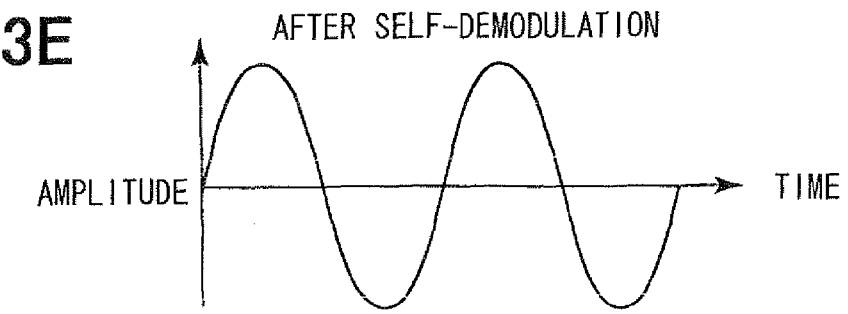
Figure 4:
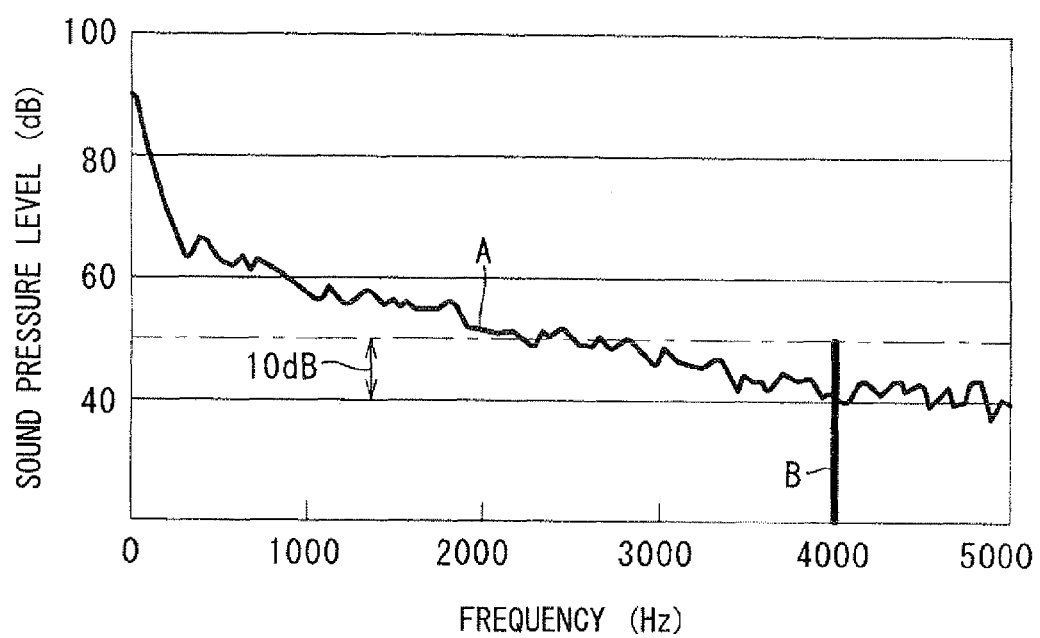
FIG. 4 is a graph illustrating a relationship between environment noise frequency characteristic and sound pressure level of notification sound at fundamental high frequency.

When the vehicle presence notification apparatus operates, the ultrasound speaker 1 radiates the ultrasound (not audible) obtained from the amplitude modulation of the frequency signal indicating the notification sound, as shown in FIG. 3C. As shown in FIG. 3D, during propagation of the ultrasound through air, the ultrasound with small wavelengths is distorted due to non-linear effects such as air viscosity, etc. Then, as shown in FIG. 3E, the air-propagating ultrasound is self-demodulated and the amplitude component (a carried signal component) contained in the ultrasound is made audible. As a result, the notification sound (which is the synthesized sound with 4 kHz, 2 kHz, 1 kHz, 500 Hz) is produced at a point spaced apart from an ultrasound source (i.e., the ultrasound speaker 1).

[First Advantage of First Embodiment]

As described above, the vehicle presence notification apparatus simultaneously generates as the notification sound:

(i) sound with a fundamental high frequency of 4 KHz, which is easily sticking to human ears and generally considered as uncomfortable sound, and (ii) sound with three auxiliary low frequencies of 2 kHz, 1 kHz and 500 Hz, each of which is smaller than the fundamental high frequency and has the harmonic relation with the fundamental high frequency.

Figure 5A:
FIGS. 5A and 5B are diagrams each illustrating a relationship between sound property and sound frequency.

Since the notification sound contains the sticking sound at 4 KHz, the notification sound can be easily-perceivable and has a high probability of successfully notifying the presence of the vehicle to the surroundings of the vehicle. The inventor of the present application has found out the following. As shown in FIG. 5A, when the sound is made so as to have, in addition to a single frequency of 500 Hz, higher harmonic frequencies of 1 kHz, of 2 kHz and of 4 kHz in turn, the sound becomes more easily-perceivable. In the case of the notification sound containing 4 kHz sound, the notification sound can have a high probability of successfully being perceived. In FIG. 5A, the sound A has a single frequency of 500 Hz, and the sound B has multiple frequencies of 500 Hz and 1 kHz, the sound C has multiple frequencies of 500 Hz, 1 kHz and 2 kHz, and the sound D has multiple frequencies of 500 Hz, 1 kHz, 2 kHz and 4 kHz.

Figure 5B:

In addition to the above, the inventor of the present application has found out the following. When the notification sound simultaneously has three auxiliary low frequencies 2 kHz, 1 kHz and 500 Hz in addition to the fundamental high frequency 4 kHz, the notification sound containing the fundamental high frequency of 4 kHz is made softer, the uncomfortable feeling provided to people is reduced. More specifically, as shown in FIG. 5B, when the sound is made so as to have, in addition to a single frequency of 4 kHz, lower harmonic frequencies of 2 kHz, of 1 kHz and of 500 Hz in turn, the sound can be softer. The notification sound containing the 500 Hz sound is less-uncomfortable and easily-perceivable. In FIG. 5B, the sound E has a single frequency of 4 kHz, and the sound F has multiple frequencies of 4 kHz and 2 kHz, the sound G has multiple frequencies of 4 kHz, 2 kHz and 1 kHz, and the sound H has multiple frequencies of 4 kHz, 2 kHz, 1 kHz, and 500 Hz.

In addition to the above, the inventor of the present application has found out the following. Because the frequency component with the fundamental high frequency of 4 kHz has a harmonic relation with the frequency components with three auxiliary low frequencies 2 kHz, 1 kHz and 500 Hz, a missing fundamental takes place and creates an illusion of perception of nonexistent 250 Hz sound. Because of the perception of nonexistent 250 Hz sound, the notification sound can be perceived as softer sound and the uncomfortable feeling provided to people can be reduced. In this way, the vehicle presence notification apparatus of the present embodiment can suppress the uncomfortable feeling to be provided to people, while achieving a high probability of successfully notifying the presence of the vehicle to the surroundings.

[Second Advantage of First Embodiment]

According to the vehicle presence notification apparatus of the present embodiment, the multiple auxiliary low frequencies include at least a frequency of one half of the fundamental high frequency. Specifically, the multiple auxiliary low frequencies of the notification sound include a frequency of 2 kHz, which is one half of the fundamental high frequency 4 kHz. Therefore, it is possible to successfully notify the presence of the vehicle, with high probability, to elder persons incapable of hearing the sound with the fundamental high frequency of 4 kHz, because the notification sound contains the sound with 2 kHz, which are easily perceived even by the elder persons.

[Third Advantage of First Embodiment]

In the present embodiment, the auxiliary low frequencies of the notification sound include three or more frequencies that have the harmonic relation and that are in series with each other in the harmonic relation. Specifically, in the case of the 4 kHz fundamental high frequency, the three consecutive auxiliary low frequencies having the harmonic relation are 2 kHz, 1 kHz and 500 Hz. By using these three or more auxiliary low frequencies, it is possible increase frequency components that are not perceived as uncomfortable, and it is possible to enhance the missing fundamental, which causes pseudo addition of lower frequency harmonic sound. As a result, it is possible to make the notification sound softer and it is possible to suppress the uncomfortable feeling caused by the notification sound.

[Fourth Advantage of First Embodiment]

Since one of the auxiliary low frequencies of the notification sound is 500 kHz (smaller than 1 kHz), it is possible to surely make the notification sound softer and suppress the uncomfortable feeling caused by the notification sound.

[Fifth Advantage of First Embodiment]

The vehicle presence notification apparatus of the present embodiment emits the notification sound (i.e., the notification sound carried by the ultrasound) from the parametric speaker toward the outside of the vehicle. By using the paramedic speaker, it is possible to generate and make the notification sound audible at a point spaced apart from the vehicle. In addition, since the parametric speaker has a strong directivity, it is possible to generate the notification sound in only a specific direction. Therefore, it is possible to generate the notification sound only in a predetermined notification target area for notification of the vehicle presence. In other words, it is possible to prevent generation of the notification sound in an area to which the vehicle presence notification apparatus needs not to notify the presence of the vehicle. It is possible to reduce generation of vehicle noise. In the above, the predetermined notification target area may be an area that is spaced apart from the vehicle by a predetermined distance, and that may be located diagonally forward of the vehicle on a side walk side for instance.

[Sixth Advantage of First Embodiment]

The vehicle presence notification apparatus of the present embodiment automatically adjusts output level (sound volume) of the ultrasound speaker 1 based on the environment noise of the outside of the vehicle, so that the sound pressure level of the generated notification sound at the fundamental high frequency is larger than, by 10 dB, that of the environment noise at the fundamental high frequency read by the read portion 9. In this way, it is possible to generate the notification sound at the fundamental high frequency that withstands the environment noise, and it is possible to prevent the notification sound at the fundamental high frequency from having too large sound pressure level. As a result, it is possible to successfully notify the presence of the vehicle with high probability by using the notification sound, while suppressing vehicle noise generation.

[Seventh Advantage of First Embodiment]

In the present embodiment, since the notification sound is synthesized from sound components with multiple frequencies of 4 kHz, 2 kHz, 1 kHz and 500 Hz, and since these multiple frequencies have the harmonic relation with each other, it is possible to allow human ears to perceive the notification sound as a single tone (e.g., C tone in twelve-tone equal temperament in the present embodiment).

Second Embodiment

A second embodiment will be described.

In the first embodiment, the notification sound has the fundamental high frequency of 4 kHz and the multiple auxiliary low frequencies of 2 kHz, 1 kHz and 500 Hz, which have the harmonic relation with the fundamental high frequency. By contrast, in the present embodiment, the notification sound has multiple fundamental high frequencies and multiple groups of auxiliary low frequencies. Each group of auxiliary low frequencies corresponds to one of the multiple fundamental high frequencies and has the harmonic relation with the one of the multiple fundamental high frequencies.

Specifically, in the present embodiment, the multiple fundamental high frequencies form a chord (e.g., CEG, DFA, EGB, ACE, BDFA etc. in equal temperament). The formed chord may be a major chord or a minor chord. For example, when the multiple fundamental high frequencies form a chord "CEG", the frequencies of 4 kHz (C), 5 kHz (E) and 6 kHz (G) is selected as the multiple fundamental high frequencies.

In the second embodiment, the frequencies of 2 kHz, 1 kHz and 500 Hz is selected as a group of auxiliary low frequencies corresponding to one fundamental high frequency 4 kHz (C). The frequencies of 2.5 kHz, 1.25 kHz and 625 Hz are selected as a group of auxiliary low frequencies corresponding to the fundamental high frequency 5 kHz (E). The frequencies of 3 kHz, 1.5 kHz and 750 Hz are selected as a group of auxiliary low frequencies corresponding to the fundamental high frequency 6 kHz (G).

That is, in the present embodiment, the notification sound is synthesized from: C tone sound with 4 kHz, 2 kHz, 1 kHz and 500 Hz; E tone sound with 5 kHz, 2.5 kHz, 1.25 kHz and 625 Hz; and G tone sound with 6 kHz, 3 kHz, 1.5 kHz and 750 Hz.

In the second embodiment, since the notification sound, which is used to surely notify the presence of the vehicle, forms a chord and since the chord is generally perceived as comfortable sound by human, it is possible to further suppress the uncomfortable feeling, which results from the notification sound generated by the vehicle.

(Modifications)

The above embodiments can be modified in various ways, examples of which will be described below.

In the above embodiments, the notification sound is generated in the front of the vehicle when the vehicle is moving forward. Alternatively, the notification sound may be generated on the rear of the vehicle and an area around the rear of the vehicle when the vehicle is moving backward.

In the above embodiment, the notification sound is generated and made audible at a point spaced apart from the vehicle by using a parametric speaker. Alternatively, the notification sound is directly generated from a notification sound generator (e.g., a speaker) equipped in the vehicle. Alternatively, the parametric speaker and the notification sound generator for directly emitting the notification sound may be selectively switched according to situations.

In the above embodiments, the notification sound has the at least one fundamental high frequency and the at least one auxiliary low frequency that have the harmonic relation with each other and that are in series with each other in the harmonic relation (e.g., 4 kHz, 2 kHz, 1 kHz and 500 Hz). Alternatively, the at least one fundamental high frequency and the at least one auxiliary low frequency may not be in series with each other in the harmonic relation. For example, the at least one fundamental high frequency and the at least one auxiliary low frequency may be a group of 4 kHz, 1 kHz and 500 kHz, or, another group of 4 kHz, 2 kHz and 500 Hz. Like these example, some frequency may be omitted from a series of harmonic frequencies.

In the above embodiment, the notification sound has the at least fundamental high frequency and the at least one auxiliary low frequency. The notification sound may further have another frequency that does not have the harmonic relation with the at least fundamental high frequency. In other words, when being generated, the notification sound may be mixed with other sound.

While the invention has been described above with reference to various embodiments thereof, it is to be understood that the invention is not limited to the above described embodiments and construction. The invention is intended to cover various modification and equivalent arrangements. In addition, while the various combinations and configurations described above are contemplated as embodying the invention, other combinations and configurations, including more, less or only a single element, are also contemplated as being within the scope of embodiment.

What is claimed is:

1. A vehicle presence notification apparatus for notifying a presence of a vehicle by providing notification sound outside of the vehicle, the vehicle presence notification apparatus comprising:
    a speaker; and
    a controller configured to cause the speaker to generate the notification sound that simultaneously has:
        (i) a fundamental audible high frequency, which is easily perceivable, but annoying to human ears; and
        (ii) an auxiliary audible low frequency, which is lower than the fundamental high frequency and has a harmonic relation with the fundamental high frequency, wherein the harmonic relation is an overtone harmonic relation in which the fundamental high frequency, which is an audible frequency, is n times as large as the auxiliary low frequency, wherein n is a natural number greater than or equal to 2.

2. The vehicle presence notification apparatus according to claim 1, wherein:
    the fundamental audible high frequency is selected from a range greater than or equal to 3 kHz and less than or equal to 7 kHz.

3. The vehicle presence notification apparatus according to claim 1, wherein:
    the auxiliary audible low frequency includes a frequency of one half of the fundamental high frequency.

4. The vehicle presence notification apparatus according to claim 1, wherein:
    the auxiliary audible low frequency is a plurality of auxiliary low frequencies each having the harmonic relation with the fundamental high frequency.

5. The vehicle presence notification apparatus according to claim 1, wherein:
    the auxiliary audible low frequency includes a frequency smaller less than 1 kHz.

6. The vehicle presence notification apparatus according to claim 1, wherein:
    the speaker is a parametric speaker configured to radiate the notification sound toward the outside of the vehicle.

7. A vehicle presence notification apparatus for notifying a presence of a vehicle by providing notification sound outside of the vehicle, the vehicle presence notification apparatus comprising:
    a speaker; and
    a controller configured to cause the speaker to generate the notification sound that simultaneously has:
        (i) at least one fundamental high frequency, which is easily perceivable, but annoying, to human ears; and
        (ii) at least one auxiliary low frequency, which is less than the at least one fundamental high frequency and has a harmonic relation with the at least one fundamental high frequency,
    wherein:
    the speaker is a parametric speaker configured to radiate the notification sound toward the outside of the vehicle, and
    the controller includes:
        a notification sound signal generation portion configured to generate a frequency signal including the at least one fundamental high frequency and the at least one auxiliary low frequency;
        an ultrasound amplitude modulation portion configured to modulate the frequency signal into an amplitude change of voltage or current oscillating at an ultrasound frequency, thereby generating an amplitude signal having the ultrasound frequency; and
        a speaker drive portion configured to drive the parametric speaker in accordance with the amplitude signal having the ultrasound frequency, which is obtained from amplitude modulation in the ultrasound amplitude modulation portion.

8. A vehicle presence notification apparatus for notifying a presence of a vehicle by providing notification sound outside of the vehicle, the vehicle presence notification apparatus comprising:
    a speaker; and
    a controller configured to cause the speaker to generate the notification sound that simultaneously has:
        (i) at least one fundamental high frequency, which is easily perceivable, but annoying, to human ears; and
        (ii) at least one auxiliary low frequency, which is less than at least one fundamental high frequency and has a harmonic relation with at least one fundamental high frequency, environment noise detection means for detecting environment noise of the outside of the vehicle;

read means for reading sound pressure level of the environment noise at the at least one fundamental high frequency, the environment noise being detected by the environment noise detection means; and sound pressure level change means for changing a sound pressure level of the generated notification sound so that the sound pressure level of the generated notification sound at the at least one fundamental high frequency is larger the sound pressure level, which is read by the read means, of the environment noise at the at least one fundamental high frequency by a predetermined sound pressure.

9. A vehicle presence notification apparatus for notifying a presence of a vehicle by providing notification sound outside of the vehicle, the vehicle presence notification apparatus comprising:

a speaker; and a controller configured to cause the speaker to generate the notification sound that simultaneously has:

(i) at least one fundamental high frequency, which is easily perceivable, but annoying, to human ears; and (ii) at least one auxiliary low frequency, which is less than the at least one fundamental high frequency and has a harmonic relation with the at least one fundamental high frequency, wherein:

the fundamental high frequency is a plurality of fundamental high frequencies;

the auxiliary low frequency is a plurality of groups of auxiliary low frequencies;

the plurality of groups of auxiliary low frequencies corresponds to the plurality of fundamental high frequencies, respectively;

each group of auxiliary low frequencies has the harmonic relation with a corresponding one of the plurality of fundamental high frequencies; and the plurality of fundamental high frequencies forms a chord.

10. The vehicle presence notification apparatus according to claim 1, wherein:

the auxiliary audible low frequency includes a plurality of auxiliary audible low frequencies expressed as $A \times (\frac{1}{2})^n$, where A is the fundamental high frequency and n is a natural number greater than or equal to 1.

* * * * *